P. E. PARSONS.
MITER BOX AND CALCULATOR.
APPLICATION FILED DEC. 11, 1912.
1,128,718.
Patented Feb. 16, 1915.
5 SHEETS—SHEET 5.
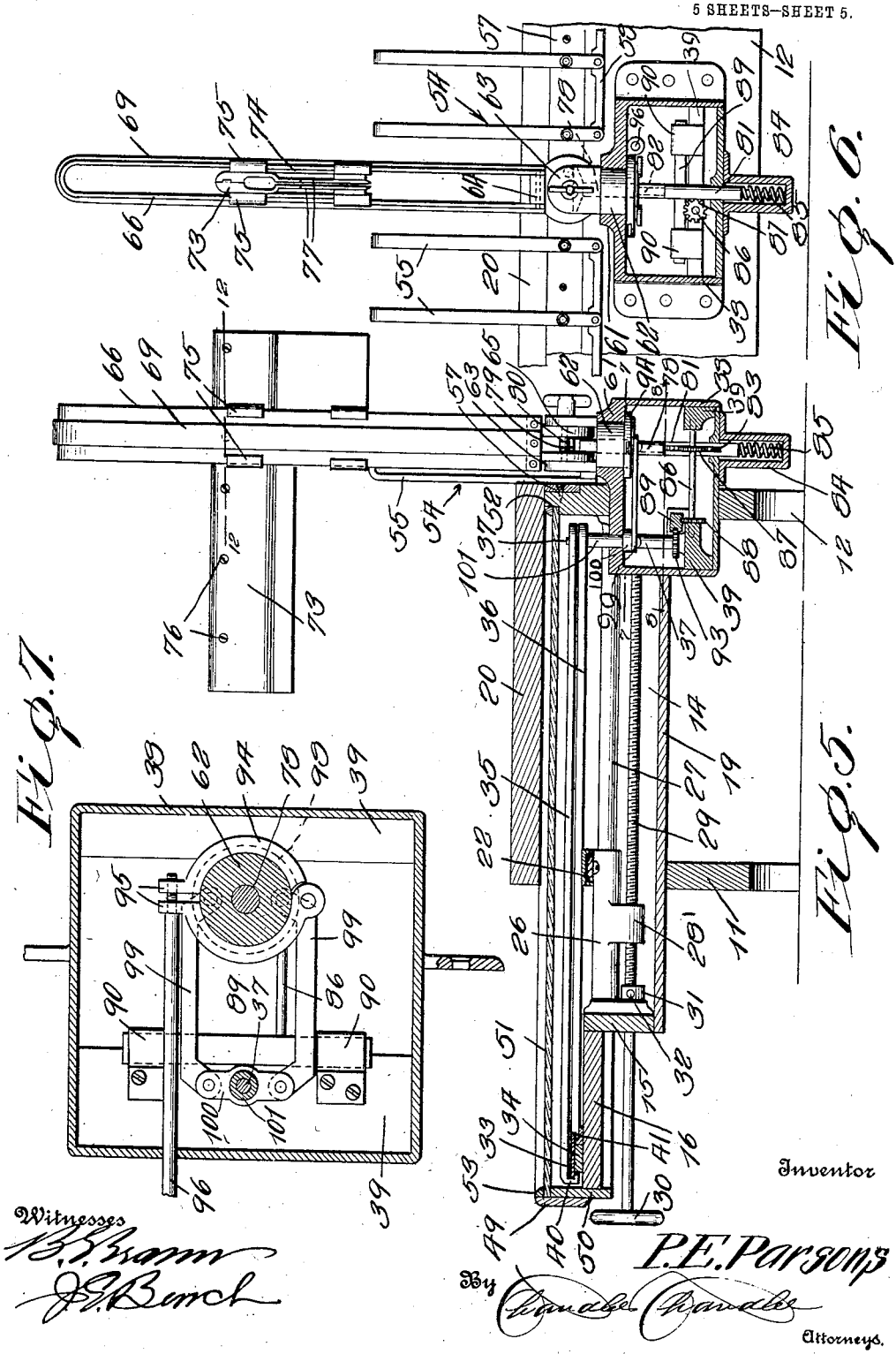

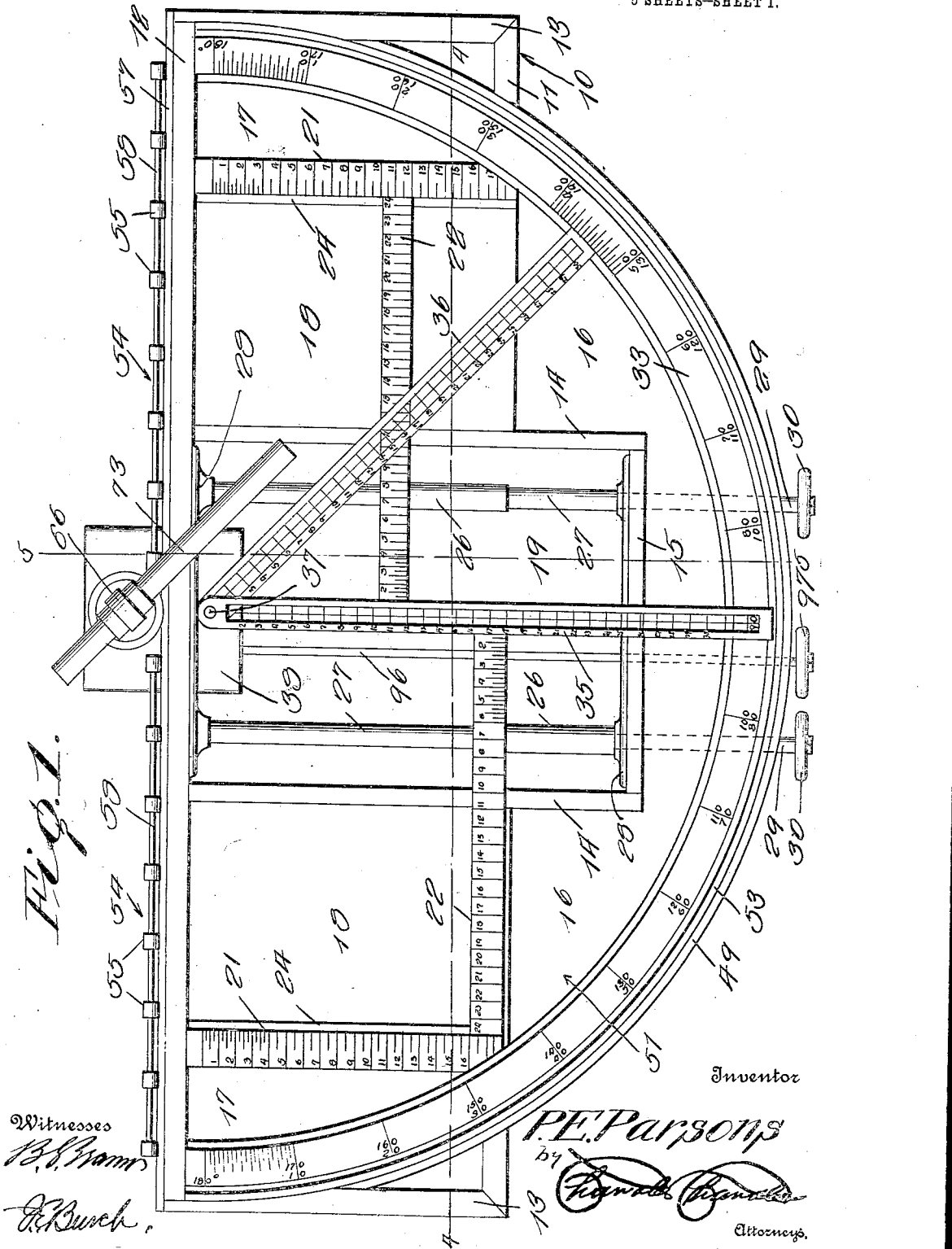

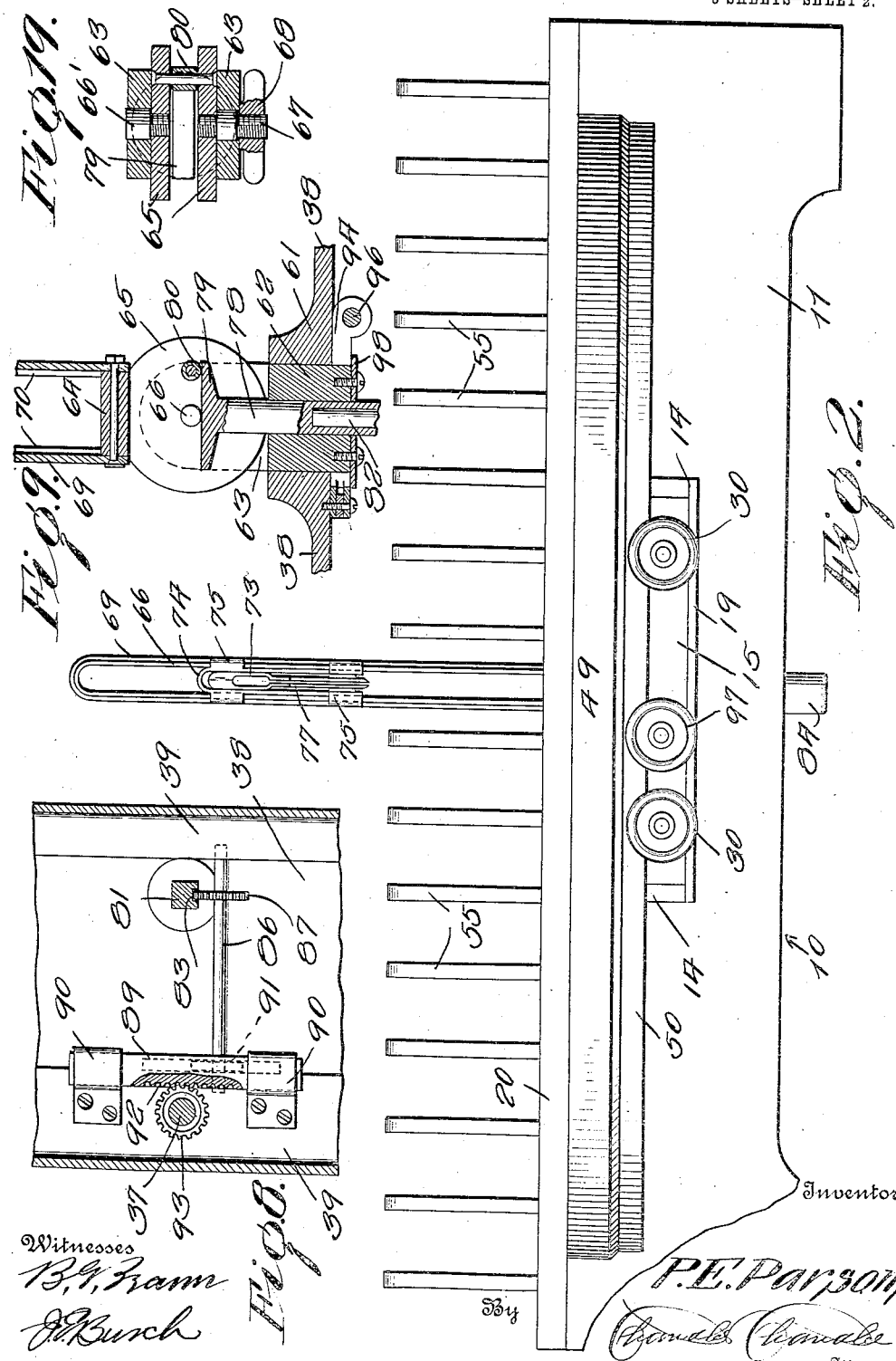

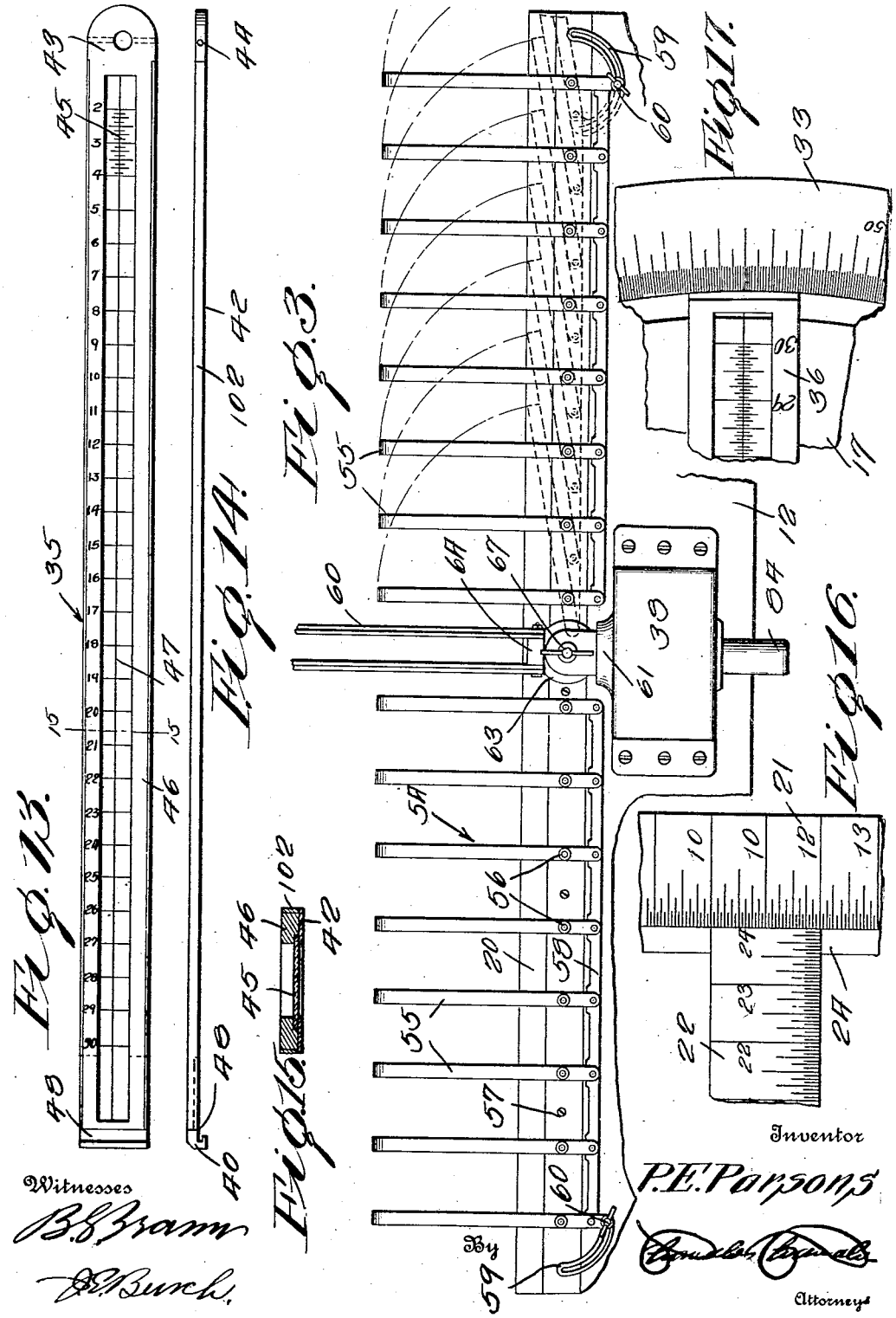

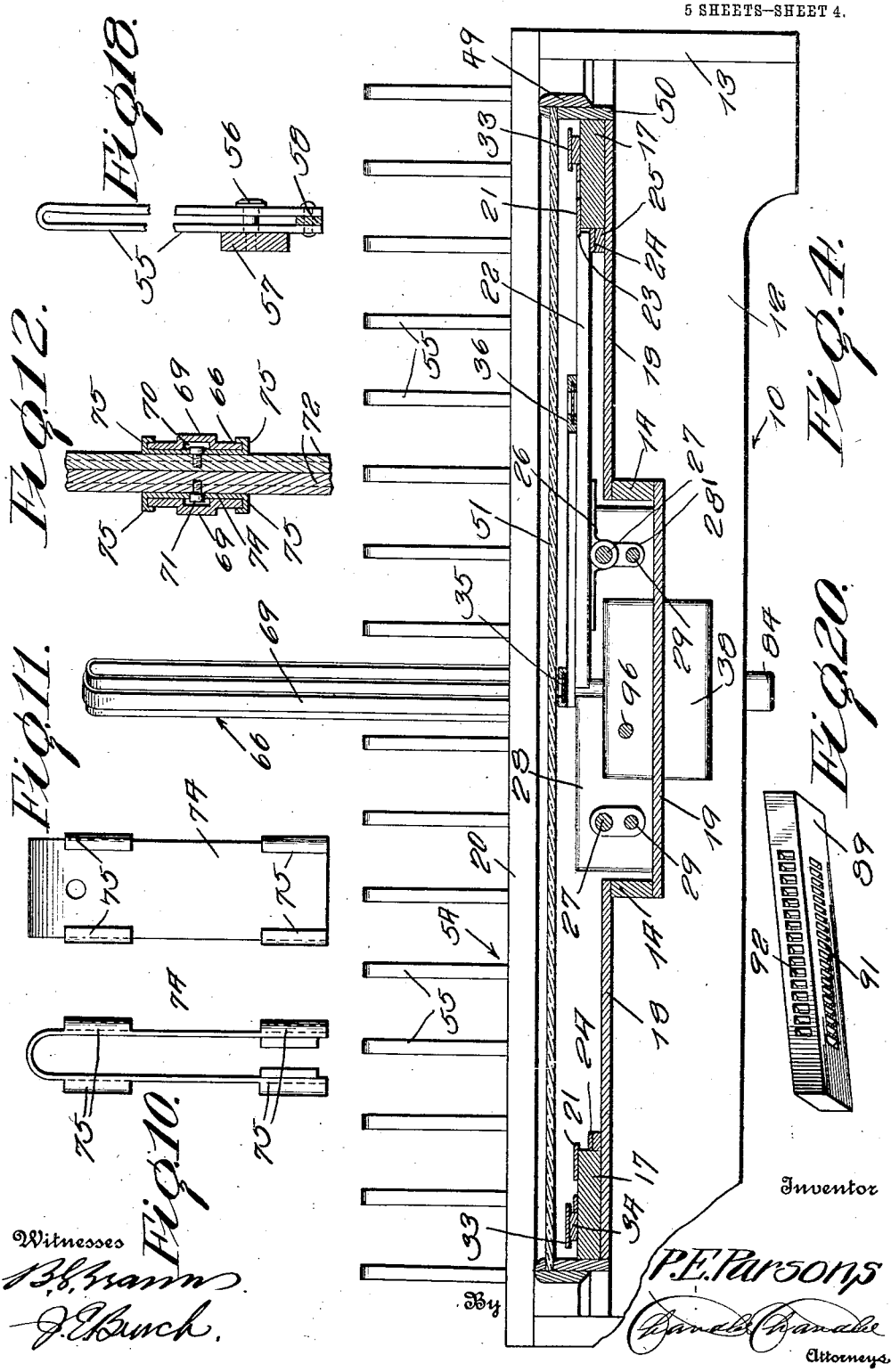

UNITED STATES PATENT OFFICE.

PETER E. PARSONS, OF SALT LAKE CITY, UTAH.

MITER-BOX AND CALCULATOR.

1,128,718.     Specification of Letters Patent.     Patented Feb. 16, 1915.

Application filed December 11, 1912. Serial No. 736,152.

*To all whom it may concern:*

Be it known that I, PETER E. PARSONS, a citizen of the United States, residing at Salt Lake City, in the county of Salt Lake, State of Utah, have invented certain new and useful Improvements in Miter-Boxes and Calculators; and I do hereby declare the following to be a full, clear, and exact description of the invention, such as will enable others skilled in the art to which it appertains to make and use the same.

This invention has special reference to miter boxes or machines and is designed as an improved device of this character adapted for use in the professional trade to facilitate the angular cutting of material, either at vertical or horizontal angles independently or simultaneously and more especially any angle that can be produced on a steel square having a tongue 18 inches long and a blade 24 inches long or by degrees, any angle vertical or horizontal from five minutes of one degree to 180 degrees and which will also measure or give the diagonal length from one quarter of 1 inch up to 30 feet, as in the case of cutting rafters for a house.

The invention is further designed to provide a novel miter box structure by means of which a double-miter cut, or a cut having a miter in two different planes of any desired angularity may be accurately produced as well as a single-miter cut in either one of the two planes, while the device will simultaneously serve for readily ascertaining various calculations incident to the work in connection with which machines of this character are used in the carpenters' and joiners' art for determining relative angular and circular values and measurements, as well as the lengths of the stock to be used, especially when there is a given or known value or measurement.

Further, the invention has for its object to provide a miter box and calculator having a novel base structure arranged to support the machine parts in an accessible manner but to protect the same from being covered or rendered invisible, or inoperative from the saw-dust or exterior particles which might settle thereon.

Furthermore, it is the object of this invention to provide a device of the above character having a saw lead and guide for movably receiving the saw for the cutting operation and novel means for the adjustments of the lead and guide according to the relative sizes of the materials to be cut and the desired angularity of the cut.

It is also an object of the invention to provide an improved collapsible fence or back rest for the work which may be disposed at any required height above the bed board upon which the material to be sawed is placed, whereby the interference thereof with the movements of the saw during the cutting operation, will be prevented, while said fence may be disposed below the top face of the bed board to especially facilitate the work when cutting the various vertical or combined vertical and horizontal angles.

Still further, it is the object to provide a miter box having a base structure having its surface divided into two equal squares or rectangles having a common side and in which said sides are divided or marked by scales, each having a movable side, while a similarly marked arc incloses the squares and is arranged for determining the angular adjustments of the saw lead and saw therein, but more especially in which said lead is connected to indicators movable in arcs from a pivot concentric to the aforesaid arc marked in degrees, so that the indicators and lead will move simultaneously when the lead is adjusted and the indicators will make visible the degree of angular movement of the lead either horizontal or vertical, or both.

With the above and other objects in view, the invention resides more particularly in the peculiar combination and arrangements of parts as will be partly illustrated as a preferred embodiment in the accompanying drawings and described in the specification, although the invention is protected for all desirable changes and uses within the scope of the invention as claimed.

In the drawings; Figure 1 is a top plan view showing the preferred embodiment of my improved miter box and calculator. Fig. 2 is a front elevation thereof. Fig. 3 is a rear elevation thereof. Fig. 4 is a vertical longitudinal sectional view taken on the line 4—4 of Fig. 1. Fig. 5 is a vertical cross sectional view taken on the line 5—5 of Fig. 1. Fig. 6 is a fragmentary rear elevation of the central portion of the device, the same being shown partly in section. Fig. 7 is an enlarged horizontal detail sectional view taken on the line 7—7 of Fig. 5. Fig. 8 is a similar view taken on the line 8—8 of Fig. 5.

Fig. 9 is an enlarged vertical sectional view through a fragmentary portion of the saw lead and its support. Fig. 10 is a detail edge view of the saw guide which slidably engages the saw lead. Fig. 11 is a side elevation of the device shown in Fig. 10. Fig. 12 is a horizontal sectional detail taken on the line 12—12 of Fig. 5. Fig. 13 is an enlarged plan view of one of the indicators. Fig. 14 is an edge view thereof. Fig. 15 is a cross sectional view taken on the line 15—15 of Fig. 13. Fig. 16 is an enlarged fragmentary detail of an outer side of one of the squares into which the base is divided and the adjacent portion of the movable side, to more clearly show the minute scale measurements thereon. Fig. 17 is a similar view of a portion of the graduated arc or plate and the adjacent portions of one of the indicators. Fig. 18 is an enlarged end elevation of one of the posts of the fence or back rest for the miter box to illustrate the manner of pivotally supporting the same, the supports being shown in section. Fig. 19 is a detail sectional view taken through the pivot of the saw lead. Fig. 20 is a detail perspective view of a double rack bar employed with the device.

In illustrating the preferred embodiment of my improved miter box and calculator, the same is shown as embodying a base or stand indicated generally by the numeral 10 and consisting of the front portion 11 and a back portion 12 connected at their extremities by the right and left hand end pieces 13, whereby an elongated rectangular base frame is provided. A supplemental frame or depressed box is positioned centrally in the base or stand and comprises the side portions 14 connected by the front end section 15 and the spaces around this depressed box are closed by the front wood or metal bottom or filler 16, the segmental side filler sections 17 and the bottom sections 18 which are disposed in a plane below the filler sections and occupy the space within the squares into which the base is divided, as will be hereinafter more fully set forth. The depressed box is provided with a bottom 19 connected respectively to the portions 14 and 15 thereof and supported by the front and back portions of the stand as clearly illustrated in Figs. 1, 4 and 5 of the drawings.

Supported on the base frame 10 is the bed board 20 which is removable to facilitate the sawing operation by rendering the scale marks readily visible, but which in practice is adapted to support the work to be operated on by a saw. This bed board is removed in Fig. 1 of the drawings, but the other views in which this board is shown will readily illustrate its relation to the other elements of the machine.

The calculating or plotting plane is divided substantially into two rectangles having a common side and having at their outer sides the graduated bars 21, preferably 9 inches long and divided into thirty-seconds of an inch as illustrated in detail view of Fig. 16, said bars being fixedly supported upon and secured to the filler sections 17. The front portions of these rectangles are produced by similarly graduated movable bars or scales 22 which are preferably made 12 inches long and have their outer ends rabbeted as shown at 23 to engage under the projecting inner edges of the bars 21 and be slidably supported for movement at right angles to said latter bars upon metallic bearing plates 24 in turn secured to the bars 25 carried by the bottom sections 18. The inner portions of the bars 22 at their bottom faces have attached thereto, through the medium of the channel shape of the bars, sleeve 26 having smooth bores for the slidable mounting thereof upon transversely disposed horizontal guide rods 27 which are anchored to the back 12 and the front portion 15 of the supplementary frame by engagement of their extremities in castings or bearing plates 28 suitably secured to said portions 12 and 15. These sleeves are provided with interiorly threaded lugs 28' intermediate their ends, and these lugs are in turn engaged by transverse adjusting screws 29 supported beneath the rods 27 for rotation in the same bearing plates but projecting beyond the forward end or front of the stand where they are provided with hand wheels 30 or other operating means for causing their rotation, to move the sleeves longitudinally on the rods and thus shift the graduated bars 22 relative to the bars 21. The sleeves 26 are provided with depending apertured and screw-threaded extensions 28' which are engaged with the threaded portions of the screws 29; while the collars 31 are secured in fixed relation on the screws 29 and abut against the contiguous element 28, and thus prevent longitudinal movement of the screws, while the sleeves 26 slide freely upon the guide rods 27, as more clearly illustrated in Fig. 5 of the drawings. Inclosing the two aforesaid rectangles, formed by the bars 21 and 22, is a semicircular or arc plate 33 of a radius considerably greater than a side of either said rectangle, such arc being of 180 degrees and accurately divided and marked in degrees and minutes as illustrated, the markings being oppositely graduated and beginning at each extremity of the arcuate scaled plate. This plate is supported upon the filler or frame sections 16 and 17 through the medium of a circular filler or supporting strip 34 which is in turn anchored to said filler sections, and it will be observed that the arc plate extends beyond the side edges of the strip 34. The purpose of this construction is made apparent by reason of the pivotal mounting of an upper indicator bar or transparent scale 35, and a lower indicator bar or transparent scale 36 mounted upon a vertical spindle or shaft 37 and a sleeve 101 respectively. This sleeve is journaled vertically through the top wall of a box like metallic case or housing 38 mounted in the back portion of the stand and projecting rearwardly thereof as shown in Figs. 1 and 5, bearing 39 being mounted within this casing to rotatably support the shaft 37 and sleeve 101 as will be hereinafter described. The outer extremity of the indicator box 35, which is thus arranged to move in an arc of 180 degrees over both of the said rectangles, is inturned, as shown at 40, engaging beneath the arcuate plate whereby the indicator bar 35 is held from displacement and guided in its movement. The indicator bar 36 moves directly over the channel bars 22 and the end bars 21 and has its outer end reduced in size as shown at 41 to engage beneath the plate 33 whereby it is guided in a plane beneath that in which the indicator 35 travels. These bars or scales 35 and 36 are preferably constructed in the manner shown in Figs. 13, 14 and 15 of the drawings and each consists of a metallic binding or bottom frame 42 longitudinally slotted and the scale 35 has an apertured end 43 secured in fixed position to the spindle or shaft 37 by means of a set screw 44, and the scale 36 is suitably secured on the sleeve 101. The bearing portion of each of these scales is considerably thicker than the frame portion and supports an intermediate transparent plate 45, preferably celluloid, which is secured to the binding by a top frame 46 preferably of box wood, these celluloid plates each having a center line 47 scribed thereon, and their outer ends are provided with metallic heads 48 for engaging the graduated plate. These transparent scales or indicators are graduated proportionate to the graduation of the bars 21 and 22, up to 30 inches or feet as is preferred in a full sized machine of this character, the graduating marks being located at either side of the center lines on the celluloid and the indication on the wood portions at the top sides thereof. In order to cover the graduated and working parts described, a retaining strip 49 is curved around the semi-circular portion or upstanding flange 50 upon which a semi-circular section of plate glass or other transparent material 51 rests in a rabbeted seat 52, the strip 49 extending above the portion 50 whereby a molding 53 secured thereto will hold the glass in position. The utility of this transparent member is to render visible the several graduations and indicating parts and at the same time to prevent the entrance of the saw dust or extraneous particles into the working parts. At the back portion of the stand are arranged two fences or work engaging members 54, the same comprising a plurality of posts 55 preferably inverted U-shaped metallic sections which are divided into two separate series and pivoted near their lower ends, as shown at 56, to a metallic supporting strip 57 screwed to the back of the stand and preferably seated therein in the manner indicated in Fig. 5 of the drawings, while the lower extremities of the posts are disposed in spaced series at either side of the central portion of the stand 10, and are connected by the bars 58, whereby the posts of either series may be simultaneously shifted on their pivots. This construction is more particularly illustrated in Fig. 3 of the drawings, wherein the posts of the fence are shown in full lines in upright positions and in dotted lines below the plane of the bed board, although it is apparent that said fence may be adjusted at any desired height above the bed board to allow adjustment of the saw for vertical angles or collapsing of the device. The outer posts of each series are extended below the connecting bars and are formed with slotted segmental or arcuate plates 59 through which are engaged clamping members 60 carried by the back portion of the stand and thereby serving to clamp the fence in a particular angular adjustment.

The metal case 38 has an apertured bearing portion 61, in rear of the stand, which rotatably receives a bearing sleeve 62 having spaced ears 63 projecting upwardly therefrom and being seated upon the top of the bearing portion 61, while a horizontal plate portion 64, of a pair of spaced apertured ears 65, has secured thereto the lower extremities of an inverted U-shaped or arched saw guide 66. These ears 65 are disposed between the ears 63 and are pivotally connected therewith through the medium of a pivot screw 66' which pivotally connects the inner pair of ears of the contracting members, while a pivot screw 67 connects the outer contacting ears, and this permits the saw guide to be swung in a vertical plane and to be held at any desired angularity by a clamping nut 68. This adjustment furnishes means for holding the guide and saw carried thereby in position for varying the angles to be cut by the device. The saw guide is provided with central outwardly offset bosses or ribs 69 on either side, and oppositely disposed vertical grooves 70, as best seen in Fig. 12, for receiving pivot screws 71 connecting the two sections 72 of the saw guide or carriage 73 to a vertically movable and substantially inverted U-shaped slide member 74 which is provided with upper and lower pairs of angular flanges 75 located at the edge portions thereof to receive the edge portions of the carriage in the channels thus formed and permit vertical movement of the carriage with the saw therein. This saw carriage 73 constitutes a movable element of the saw guide. The two sections of the saw carriage are removably secured together as shown at 76 and have forwardly located and depending plate portions 77 serving to strengthen the saw blade and more accurately guide the same in its movements. By reason of the fact that the bearing sleeve 62 is rotatably supported in the casing 38, the saw guide is also supported for rotation in addition to its pivotal support through the medium of the apertured ears, and these adjustments are for the positioning of the saw for cutting the material at any angle between vertical and horizontal, from five minutes of one degree to 180 degrees, independently or simultaneously. However, in order that the position of adjustment given to the saw at either angle may be ascertained, means are provided for simultaneously moving the scales 35 and 36 therewith, to register on the respective graduated bars, such means consisting of a plunger 78 vertically slidable through the sleeve 62 and having a cross member 79 on its upper end, forming a substantially T-shaped member which is capable of being forced downwardly by engagement with a roller 80, mounted between the ears 65, which is caused to engage the cross member as the guide is swung toward the right only. The plunger 78 is formed of two parts and further consists of the lower portion 81 having a reduced upper end 82 fitting in a counterbore in the lower end of the upper section of the plunger and provided on one side with a rack bar or with rack teeth 83 and depending into a reduced portion or spring seat 84 of the metal casing 38 wherein a coiled expansion spring 85 is mounted and tends normally to force the plunger upwardly and hold the cross member thereof normally in engagement with the roller or antifriction member 80.

A horizontal shaft 86 is rotatably journaled in the bearing blocks 39 and 39′ and carries a pinion 87 engageable with the rack teeth 83, while a pinion 88 is mounted near the forward end of the shaft 86 to engage a rack bar 89 horizontally slidable in bearings 90 carried by the bearing block 39. This rack bar 89 is arranged with two sets of teeth 91 and 92 upon the bottom and front faces thereof respectively, the set of teeth 92 being engageable with a pinion 93 at the lower portion of the spindle or shaft 37, whereby as the saw guide is swung to the right, to cause the plunger to be depressed against the action of the spring 85, rotary motion is imparted to the shaft 37, through the intermeshed pinions and rack gears, so as to swing the indicator 35 to either side of the arcuate plate. When the saw guide is moved to the right, the scale 35 will be caused to swing rightward and to indicate the desired vertical plane in which the material is to be cut on the arcuate plate 33, in degrees and minutes, whereas, if the guide is swung to the left, the roller 80 will be drawn away from the cross member of the plunger and the spring 85 will be free to exert upward pressure against the plunger 81, and cause leftward rotation of the shaft 37, to swing the indicator or scale 35 to the left.

The bearing sleeve 62, in addition to being supported by the ears 63 thereof on the bearing portion 61, has engaged therearound a friction collar or clamp 94 consisting of two pivoted sections each having an apertured ear 95 at one end, such apertures being threaded and engaged by the threaded inner end of an operating rod 96. This rod is rotatably journaled through the stand and metallic casing 38 and has a hand wheel or gripping member 97 on its outer end, for turning the rod and causing the friction clutch or collar to bind on the sleeve, to hold the saw guide against turning, or to release the sleeve and permit free turning or rotation of the guide in setting the same for cutting the various horizontal angles. This clutch or collar is supported by a washer plate 98 which is secured to the bottom end of the sleeve 62 and extends outwardly of the peripheral edge thereof. This structure is more clearly illustrated in Fig. 9 of the drawings.

In order to impart movement to the scale 36, when the saw guide is turned to the left or right of the angle indicator or calculator, a pair of links 99 are pivotally connected to the sleeve 62 by the same securing means employed for holding the washer plate 98 to the sleeve, so that as the sleeve is rotated by turning the saw guide, these rods will be reciprocated or shifted horizontally. It will be observed from Fig. 7 of the drawings that these rods are provided with inwardly offset ends, the forwardmost of which are pivotally connected to the extremities of a cross member or lever 100 rigidly secured to the sleeve 101 rotatably mounted on the shaft 37 or loose thereon, the scale 36 being secured to the sleeve 101, and a shoulder being formed at the base of the reduced upper end of the shaft 37, to accommodate the sleeve. Therefore, when the saw guide is rotated, the indicator 36 is rotated in the same direction, so as to indicate the angle through which it has been turned.

The longitudinal edges of the indicators or scales are provided with protective binding strips 102, which, and together with the metallic extremities thereof, serve to prevent warping and provide for increased durability.

In the practical use of the device, it will be apparent that, with the saw in the guide, such guide may be turned at any horizontal angle which will be indicated by the center line of the indicator scale 36 at the point of intersection thereof on the graduated semicircular plate or arc, either to the right or left. Of course the rod 96 is rotated by the wheel 97 to release the friction clutch or stop when it is desired to turn the saw and guide, the sections of the stop being caused to separate for this purpose, while after the desired adjustment is obtained the rod is rotated in the opposite direction, to draw the clutch sections together and cause them to bind on the bearing sleeve, to anchor the same. As a further instance of the utility of the device, suppose it is desired to cut rafters for a house 24 feet wide and having a roof one-half pitch, either the right or left hand wheel 30 is operated, depending on which edge of the timber the long point is wanted or the direction of the angular cut. By so doing rotation will be imparted to one of the screws 29, say the right hand screw, and the graduated bar 22 at that side will be shifted until its forward edge intersects the figure 12 or graduating line thereof on the end bar 21, this representing twelve feet which is the rise for one-half pitch of a building 24 feet wide. This being done the saw guide 66 by means of the saw, is moved or turned until the fine line longitudinally through the center of the horizontal angle indicator 36 intersects with the figure 12 on the graduated bar or scale 22, this representing half the width of a building 24 feet wide. The hand wheel 47 is operated to release the clutch or friction stop during the turning of the saw and is then tightened to hold the saw in the position set. The timber is then placed on the bed board 20 and the required degree of angularity at which the saw is disposed having been ascertained, the timber is cut off by the saw. The length of the rafters to be used will be shown on the indicator 36 where the center line thereof intersects the bar 22 and an inspection of Figs. 1 and 13 will reveal that the length of the rafter will be given in fractions of inches and in this case will be shown to be 17 feet while the point of intersection of said center line with the arcuate bar 33 will reveal at a glance that the degree of cut is 45 degrees. This is illustrated in Fig. 1 of the drawings but if a cut is wanted the degree being known, when set to cut at the known degree, the machine will show just what that cut will be on the steel square but if the cut wanted is known by the figures on the steel square and the machine set to make this cut it will show what degree of cut it is also. For illustration set the machine to cut an angle obtained by the figures 12 and 17 on the steel square and the machine will show this cut to be 54 degrees 47 minutes, or set the machine to cut an angle of 26 degrees 34 minutes and it will show this cut to be 12 and 6 on the steel square and this applies to either vertical or horizontal angles, the indicator 36 always giving the horizontal angles and the indicator 35 the vertical angles. Thus it will be seen that the machine can be set to cut both vertical and horizontal angles independently or simultaneously, either by the figures on a steel square or by the degrees or both, while both indicators show the diagonal length of any brace or rafter within its scope. Incidentally it will be seen that the machine as constructed will register up to thirty feet. When the machine is being adjusted to cut a horizontal angle only, say at 45 degrees, the saw lead will be standing upright and the indicator 35 will be disposed at an angle of 90 degrees, as shown in Figs. 1 and 4, while the machine may be set at any angle horizontally to move the indicator 36 independent of the vertical angle indicator 35 or vice versa. For illustration assume that the machine is set to saw a piece of timber off square, both indicators would in this case stand at 90 degrees on the arcuate graduated plate and then assume the next cut wanted would be 45 degrees horizontal angles. By swinging the saw either to the left or right, depending on at which angle it is desired to cut the timber, the indicator 36 will move around and indicate the exact point desired, when the saw lead will be anchored in the usual manner. The indicator 36 will thus be in the position shown in Fig. 1 to register 45 degrees and the indicator 35 will have stood still at 90 degrees. If then a vertical angle is wanted in the same cut, the friction stop would be released so as to permit the saw lead to be turned and leaned either to the right or left and in doing so, the indicator 35 will move around through the connections heretofore described and indicate the exact point of degree of angle that is wanted and the same statement applies if the figures on the coacting bars and indicator representing the steel square are used, the lead being anchored at the desired vertical angle indicated at the point of intersection of the center line of the indicator 35 with the graduations on the arcuate bar. It may be mentioned that the collapsible fence or back rest for the work is adapted for use when the machine is set to cut different vertical angles.

Having thus fully described my invention, what is claimed is:

In a miter box and calculator, a bed, a saw guide mounted to swing in both a horizontal and a vertical plane, two indicators mounted on the bed and pivoted at the same point one above the other for swinging movement in a horizontal plane, connections between one indicator and the saw guide to swing the guide in a vertical plane, and connections between the other indicator and the saw guide to swing the latter in a horizontal plane.

In testimony whereof, I affix my signature, in the presence of two witnesses.

PETER E. PARSONS.

Witnesses:
 RUPERT HANSEN,
 R. C. BASSETT.